(12) United States Patent
Wang

(10) Patent No.: US 11,044,480 B2
(45) Date of Patent: Jun. 22, 2021

(54) MORE ACCURATE 2-TAP INTERPOLATION FILTERS FOR VIDEO COMPRESSION

(71) Applicant: GOOGLE LLC, Mountain View, CA (US)

(72) Inventor: Yunqing Wang, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/256,302

(22) Filed: Jan. 24, 2019

(65) Prior Publication Data
US 2020/0244971 A1 Jul. 30, 2020

(51) Int. Cl.
| | |
|---|---|
| H04N 19/523 | (2014.01) |
| H04N 19/52 | (2014.01) |
| H04N 19/159 | (2014.01) |
| H04N 19/172 | (2014.01) |
| H04N 19/176 | (2014.01) |

(52) U.S. Cl.
CPC ......... *H04N 19/159* (2014.11); *H04N 19/172* (2014.11); *H04N 19/176* (2014.11); *H04N 19/52* (2014.11); *H04N 19/523* (2014.11)

(58) Field of Classification Search
CPC .... H04N 19/159; H04N 19/523; H04N 19/13; H04N 19/59; H04N 19/172; H04N 19/176; H04N 19/52
USPC .......................... 375/240.13, 240.16, 240.12
See application file for complete search history.

(56) References Cited

U.S. PATENT DOCUMENTS

| | | | | |
|---|---|---|---|---|
| 2004/0062307 | A1* | 4/2004 | Hallapuro | H04N 19/159 375/240.13 |
| 2008/0089417 | A1 | 4/2008 | Bao et al. | |
| 2010/0118957 | A1* | 5/2010 | Demos | H04N 19/51 375/240.15 |
| 2016/0191946 | A1* | 6/2016 | Zhou | H04N 19/523 375/240.16 |

(Continued)

FOREIGN PATENT DOCUMENTS

EP 1578137 A2 9/2005

OTHER PUBLICATIONS

Bankoski, et al., "Technical Overview of VP8, An Open Source Video Codec for the Web", Jul. 11, 2011, 6 pp.

(Continued)

*Primary Examiner* — Albert Kir
(74) *Attorney, Agent, or Firm* — Young Basile Hanlon & MacFarlane, P.C.

(57) ABSTRACT

A method for encoding a block of a video using inter prediction includes selecting, during motion estimation for the block, a first sub-pixel interpolation filter for sub-pixel interpolation of fractional motion; selecting, during motion compensation, a second sub-pixel interpolation filter based on the first sub-pixel interpolation filter; and encoding, in a compressed bitstream, the second sub-pixel interpolation filter. The first sub-pixel interpolation filter is a 2-tap filter. The first sub-pixel interpolation filter includes weight tuples. Each weight tuple includes two weights and used for sub-pixel interpolation at a sub-pixel location between a first pixel and a second pixel. For at least one weight tuple of the weight tuples, the two weights are not based on a first distance between the sub-pixel location and the first pixel and a second distance between the sub-pixel location and the second pixel.

20 Claims, 10 Drawing Sheets

(56) References Cited

U.S. PATENT DOCUMENTS

2017/0150180 A1* 5/2017 Lin .................. H04N 19/59
2018/0077423 A1* 3/2018 Xu .................. H04N 19/13

OTHER PUBLICATIONS

Bankoski et al, "VP8 Data Format and Decoding Guide", Independent Submission RFC 6389, Nov. 2011, 305 pp.
Bankoski et al, "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, Ont Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion of International Application No. PCT/US2019/059600, dated Mar. 20, 2020; 14 pp.
Anderson et al; "2-Tap/4-Tap Complexity Reduction MC" JVT Meeting; 79; Jan. 13, 2007; pp. 1-11.
Chen Yue et al; "An Overview of Core Coding Tools in the AV1 Video Codec," 2018 Picture Coding Symposium, IEEE; Jun. 24, 2018; pp. 41-45.

* cited by examiner

US 11,044,480 B2

MORE ACCURATE 2-TAP INTERPOLATION FILTERS FOR VIDEO COMPRESSION

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Various approaches have been proposed to reduce the amount of data in video streams, including compression and other encoding and decoding techniques. These techniques may involve subpixel interpolation for fractional motion.

SUMMARY

An aspect is a method for encoding a block of a video using inter prediction. The method includes selecting, during motion estimation for the block, a first sub-pixel interpolation filter for sub-pixel interpolation of fractional motion; selecting, during motion compensation, a second sub-pixel interpolation filter based on the first sub-pixel interpolation filter; and encoding, in a compressed bitstream, the second sub-pixel interpolation filter. The first sub-pixel interpolation filter is a 2-tap filter. The first sub-pixel interpolation filter includes weight tuples. Each weight tuple includes two weights and used for sub-pixel interpolation at a sub-pixel location between a first pixel and a second pixel. For at least one weight tuple of the weight tuples, the two weights are not based on a first distance between the sub-pixel location and the first pixel and a second distance between the sub-pixel location and the second pixel.

Another aspect is an apparatus for encoding a block of a video using inter prediction including a processor and a memory. The memory includes instructions executable by the processor to select, during motion estimation for the block, a first sub-pixel interpolation filter for sub-pixel interpolation of fractional motion; select a second sub-pixel interpolation filter based on a rate-distortion cost; and encode, in a compressed bitstream, the second sub-pixel interpolation filter. The first sub-pixel interpolation filter is a 2-tap filter. The first sub-pixel interpolation filter includes weight tuples. Each weight tuple includes two weights and used for sub-pixel interpolation at a sub-pixel location between a first pixel and a second pixel. For at least one weight tuple of the weight tuples, the two weights are not based on a first distance between the sub-pixel location and the first pixel and a second distance between the sub-pixel location and the second pixel.

Another aspect is an apparatus for decoding a block of a video using inter prediction including a processor and a memory. The memory includes instructions executable by the processor to decode, from an encoded bitstream, a sub-pixel interpolation filter, the sub-pixel interpolation filter used for sub-pixel interpolation of fractional motion; decode, from the encoded bitstream, a motion vector; and decode the block using the sub-pixel interpolation filter and the motion vector. The sub-pixel interpolation filter is a 2-tap filter. The sub-pixel interpolation filter includes weight tuples. Each weight tuple includes two weights and used for sub-pixel interpolation at a sub-pixel location between a first pixel and a second pixel. For at least one weight tuple of the weight tuples, the two weights are not based on a first distance between the sub-pixel location and the first pixel and a second distance between the sub-pixel location and the second pixel.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
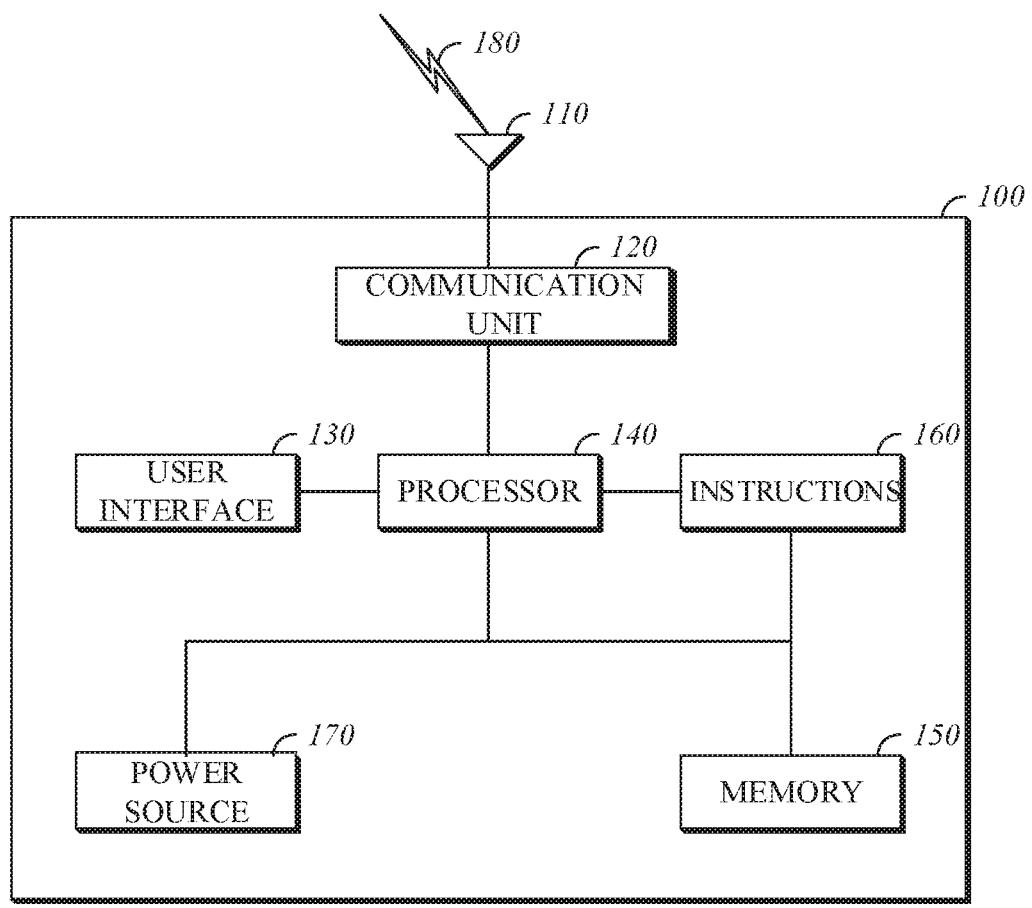
FIG. 1 is a diagram of a computing device in accordance with implementations of this disclosure.

Video compression schemes may include breaking each image, or frame, into smaller portions, such as blocks, and generating an output bitstream using techniques to limit the information included for each block in the output. An encoded bitstream can be decoded to re-create the source images from the limited information. In some implementations, the information included for each block in the output may be limited by reducing spatial redundancy, reducing temporal redundancy, or a combination thereof. For example, temporal or spatial redundancies may be reduced by predicting a frame based on information available to both the encoder and decoder, and including information representing a difference, or residual, between the predicted frame and the original frame.

Encoding using temporal similarities (e.g., redundancies) can be known as inter prediction. Inter prediction (e.g., motion-compensated prediction) attempts to predict the pixel values of a block using a possibly displaced block or blocks from a temporally nearby frame (i.e., reference frame) or frames. That is, motion-compensated prediction (MCP) can be used to exploit the temporal redundancy between video frames. A temporally nearby frame is a frame that appears earlier or later in time in the video stream than the frame of the block being encoded.

The accuracy of MCP largely determines the compression ratio. In the encoding process, and as further described below, a video frame can be divided into blocks with various sizes. For each block, a motion estimation is performed. For a current block being encoded (i.e., a current block), motion estimation conducts a motion search to find the motion vector of the block. The motion vector indicates a location of a prediction block in a reference frame (i.e., a temporally nearby frame). The prediction block is used to predict the block. Very often, the motion vector can be a fractional number. That is, the motion vector may refer (e.g., point) to a sub-pixel location in the reference frame. That is, the motion vector can be given in sub-pixel units. Said differently, the motion vector can be expressed in sub-pixel resolution. Different coding standards support different motion vector resolutions (i.e., sub-pixel units, precision). For example, in the HEVC standard, a luma motion vector can be given in quarter-luma-sample units. For example, in the VP9 standard, the maximum supported motion vector precision is $\frac{1}{16}$-pixel.

The sub-pixel value given by a motion vector can be calculated by interpolation using a filter, such as a finite impulse response (FIR) filter. Different interpolation filters can have different number of taps, which indicate how many nearby pixels are used to interpolate the sub-pixel value. A weight (i.e., coefficient) can be associated with each tap. In most video codecs, the number of taps can range from 2 to 8. For example, given an 8-tap filter with a set of eight weights $W=(w_0, w_1, \ldots, w_7)$ and eight (integer or sub-integer) pixel values $A=(A_0, A_1, \ldots, A_7)$, an interpolated pixel value, I, can be calculated as the weighted sum $I=\Sigma_{i=0}^{7} w_i * A_i$.

As mentioned, MCP may involve the use of a sub-pixel interpolation filter that generates filtered sub-pixel values at defined locations between the full pixels (also called integer pixels) along rows, columns, or both. The interpolation filter can be one of a number of interpolation filters available for use in MCP. Each of the interpolation filters can have a different frequency profile (e.g., frequency response).

A sub-pixel interpolation filter can be selected from a set of predefined or available sub-pixel interpolation filter types. For example, in the VP9 standard, the predefined sub-pixel interpolation filter types include a smooth interpolation filter (EIGHTTAP_SMOOTH), a sharp interpolation filter (EIGHTTAP_SHARP), a normal interpolation filter (EIGHTTAP), a bilinear interpolation filter (Bi-linear). The AV1 includes similarly named interpolation filters. The bilinear filter is further described below with respect to FIG. 7. Other codecs may have fewer, more, or other interpolation filters. A description of the semantics (e.g., the frequency responses, tap weights, etc.) of interpolation filter types is not necessary for the understanding or use of this disclosure.

The normal interpolation filter (EIGHTTAP) can be an 8-tap Lagrangian interpolation filter. The sharp interpolation filter (EIGHTTAP_SHARP) can be a DCT-based interpolation filter with a sharper response and is used mostly around sharper edges. The smooth interpolation filter (EIGHTTAP_SMOOTH) can be an 8-tap filter that may be designed using the windowed Fourier series approach with a Hamming window. As a person skilled in the art appreciates, filters (e.g., interpolation filters) can be designed using commercial off-the shelf tools, such as MATLAB®, which is a numerical computing environment and a proprietary programming language developed by The MathWorks®, Inc.

Longer interpolations filters (e.g., 8-tap filters) can provide higher prediction accuracy than shorter filters (e.g., 2-tap filters). As such, using longer interpolation filters can result in higher compression. However, while longer filters (e.g., 8-tap filters) provide higher prediction accuracy, shorter filters (e.g., a 2-tap filter) have lower complexity. The complexity of a coding algorithm can be measured in terms of the memory bandwidth and the number of operations required by the algorithm. In terms of memory bandwidth, utilizing longer tap filters (e.g., an 8-tap filter) compared to a shorter filter (e.g., a 2-tap filter) increases the amount of data to be fetched from memory. Similarly, a longer tap-length filter (e.g., an 8-tap filter) increases the number of arithmetic operations required to obtain the interpolated value. For example, an 8-tap filter performs a total of 15 multiply-and-add operations (MACs); namely, 8 multiplications and 7 additions. On the other hand, a 2-tap filter performs only 3 MACs; namely, 2 multiplications and 1 addition.

The interpolation operation, using an interpolation filter, can be performed during the motion estimation stage in the encoding process as well as during the motion compensation stage in both encoding process and the decoding process. The design of an interpolation filter can impact the coding performance as well as encoding and decoding speeds. The design of an interpolation filter can include the design (e.g., selection) of the weights (e.g., coefficients) used for the interpolation operations.

The interpolation filter to be used by a decoder to generate a prediction block can be signaled, in the encoded bitstream, in the header of the frame containing the block to be predicted. As such, the same interpolation filter can be used to generate sub-pixel prediction blocks for all blocks of the frame. The interpolation filter may also be signaled at a coding unit level. As such, the same interpolation filter can be used for every block (e.g., every prediction block) of the coding unit to generate sub-pixel prediction blocks for the blocks of the coding unit. A coding unit may be a 64×64, smaller, or larger, pixel block of a video frame and can be further partitioned into smaller blocks. An encoder can generate a prediction block based on each of the available interpolation filters.

The encoder can select (e.g., to signal to a decoder in the encoded bitstream) the interpolation filter that results in, e.g., the best rate-distortion cost. A rate-distortion cost refers to a ratio that balances an amount of distortion (i.e., loss in video quality) with rate (i.e., the number of bits) required for encoding.

Alternatively, the encoder (during the motion estimation process) can use low complexity filters (such as a 2-tap filter) to identify the best sub-pixel resolution (i.e., the sub-pixel resolution that corresponds to the best prediction) and then encode in the bitstream a longer interpolation filter to be used for interpolation at the identified sub-pixel resolution during motion compensation. For example, motion estimation can be performed (e.g., carried out, etc.) using one interpolation filter that the encoder chooses when finding the motion vector. In an example, the one interpolation filter can be a 2-tap filter, such as the bilateral filter, FILTER 1, referred to below. Subsequently, motion compensation can be performed using the found motion vector. The motion compensation phase can include an interpolation filter search. That is, different candidate (e.g., available) interpolation filters can be tried and the one that results in the best rate-distortion cost can be selected. The selected interpolation filter can be transmitted in the bitstream so that the encoder and the decoder can use the same interpolation filter. As further described below, and for better coding performance, the taps of selected interpolation filter are typically equal to or greater than that of the interpolation filter that is used during motion estimation. As such, the selected filter can be one of the 2-tap filter, the EIGHTTAP, the EIGHT-TAP_SHARP, or the EIGHTTAP_SMOOTH filters, which are further described below.

Additionally, some real-time video applications (such as video conferencing, screen sharing, etc.), may sacrifice quality in order to improve the responsiveness of the application. For example, instead of using longer interpolation filters, a 2-tap interpolation filter may be used in both motion estimation and motion compensation. An example of the 2-tap filter is the bilateral filter, which uses a triangular kernel as described with respect to FIG. 7.

The coding performance using the bilateral filter may not be as optimal as the coding performance that can be achieved using filters with higher number of taps. As such, it is desirable to use 2-tap filters that can provide a coding performance that approximates that of longer filters and that is better than the coding performance of the bilateral filter.

Using interpolation filters with low complexity (e.g., interpolation filters with smaller number of taps) but which provide high prediction accuracy, which approximates the prediction accuracy of longer interpolation filters, can improve the overall performance of video codecs.

Figure 7:
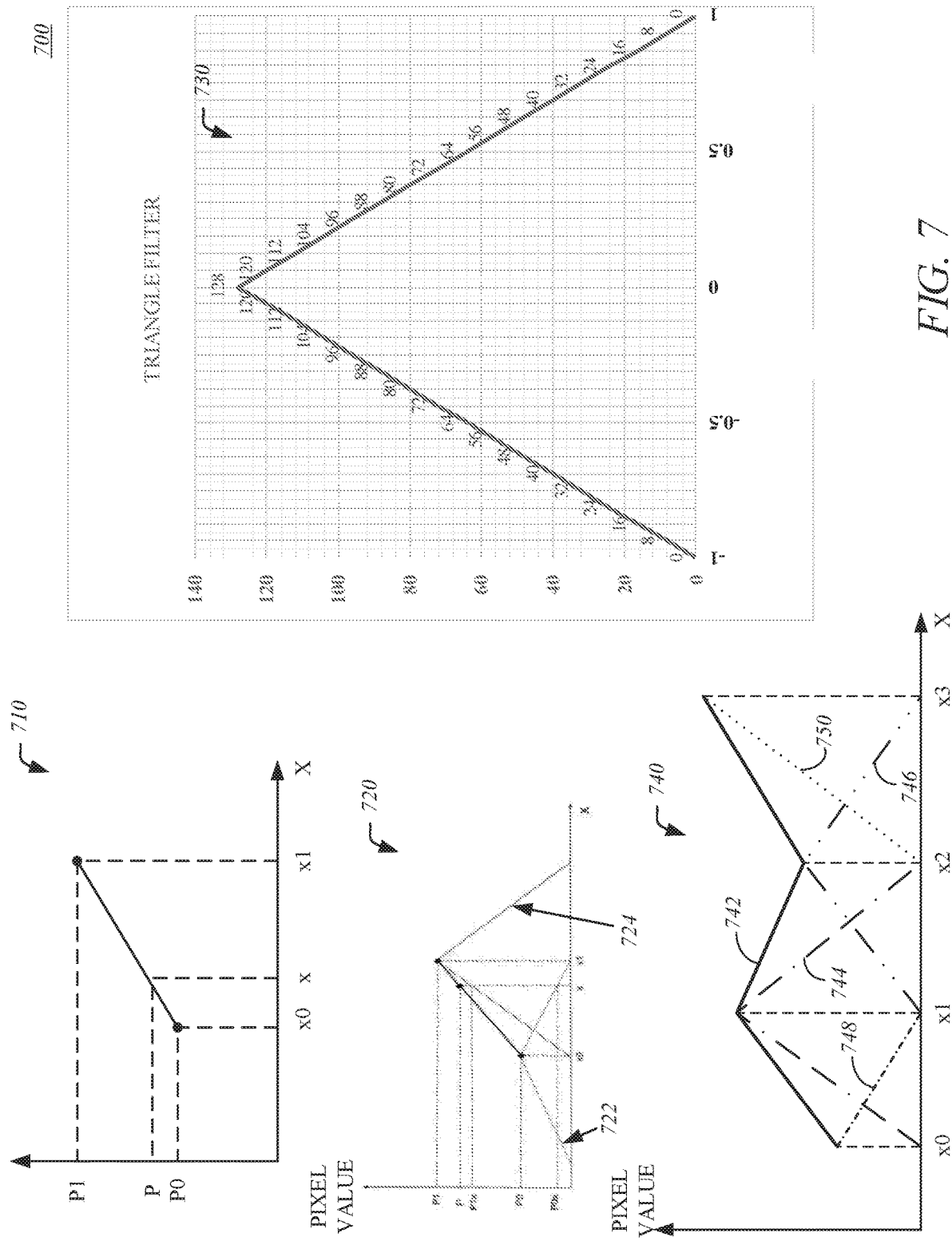
FIG. 7 is an illustration of a bilateral filter in accordance with implementations of this disclosure.

Implementations according to this disclosure can use weight-redistributed triangle kernels (e.g., filters) to obtain coding performances that approximate the performance of longer interpolation filters. As is known, a triangle filter, which is further described with respect to FIG. 7, is a 2-tap convolution filter that calculates, at a sample point (i.e., the interpolated pixel value), the weighted average of two neighboring pixels according to distances of the sample point to each of the two neighboring pixels. That is, the weights are inversely proportional to distances.

A weight-redistributed triangle filter is such that for at least some of the sampling points (i.e., sampling locations, sub-pixel locations, etc.) the weights are not proportional (e.g., inversely proportional) to the distances. Using the 2-tap interpolation filters described herein better conserves edges in video frames and/or provide a more accurate prediction for at least some video blocks. For a set of videos with edges, using the filters described herein (i.e., the weight-redistributed triangle kernels) can result in 0.5% to 0.8% bitrate reduction.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" (e.g., apparatus) includes any unit, or combination of units, capable of performing any method, process, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a special purpose processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, process, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
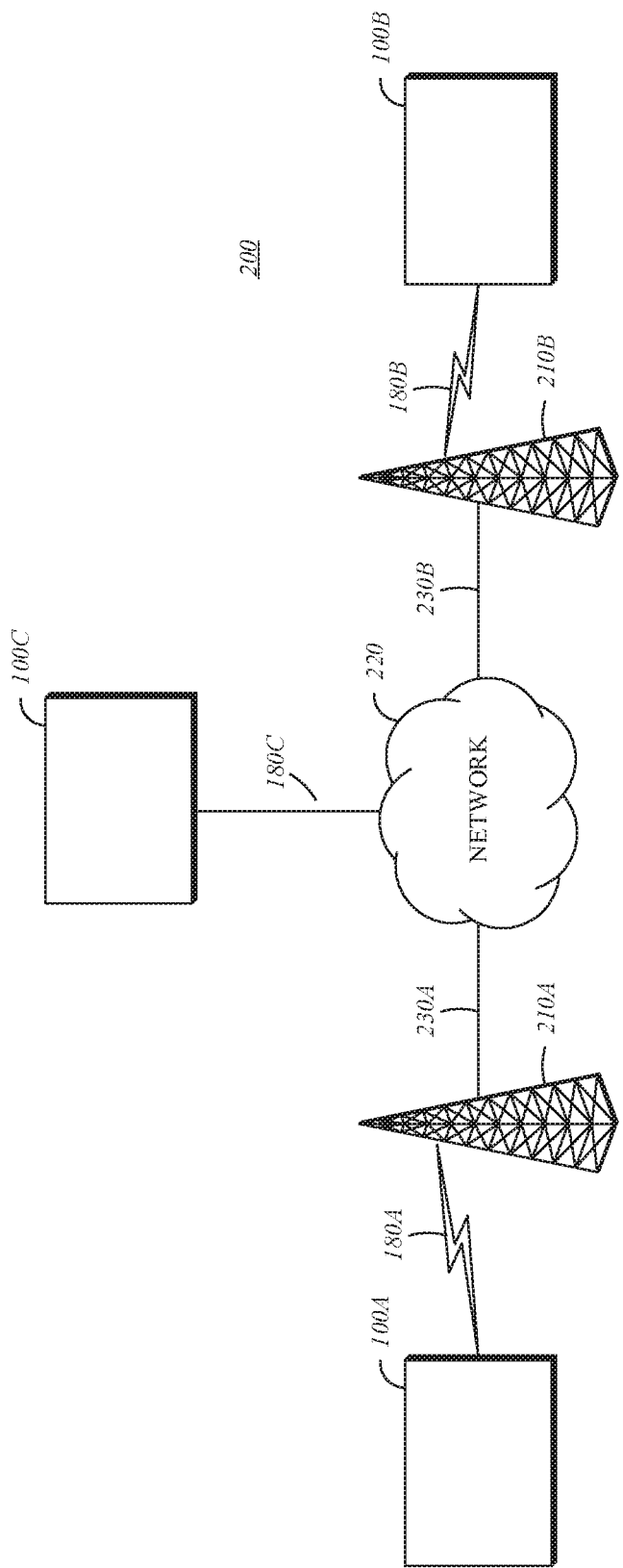
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
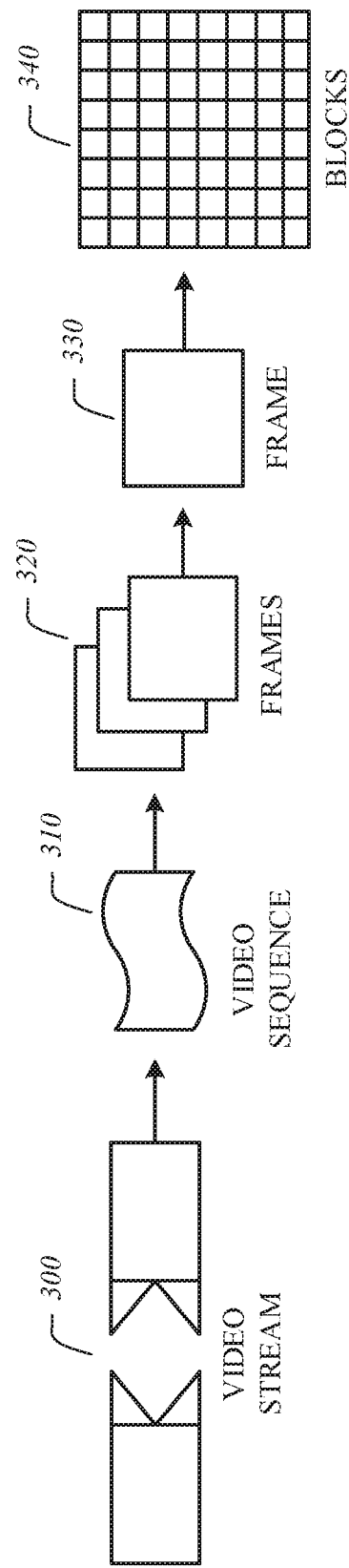
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
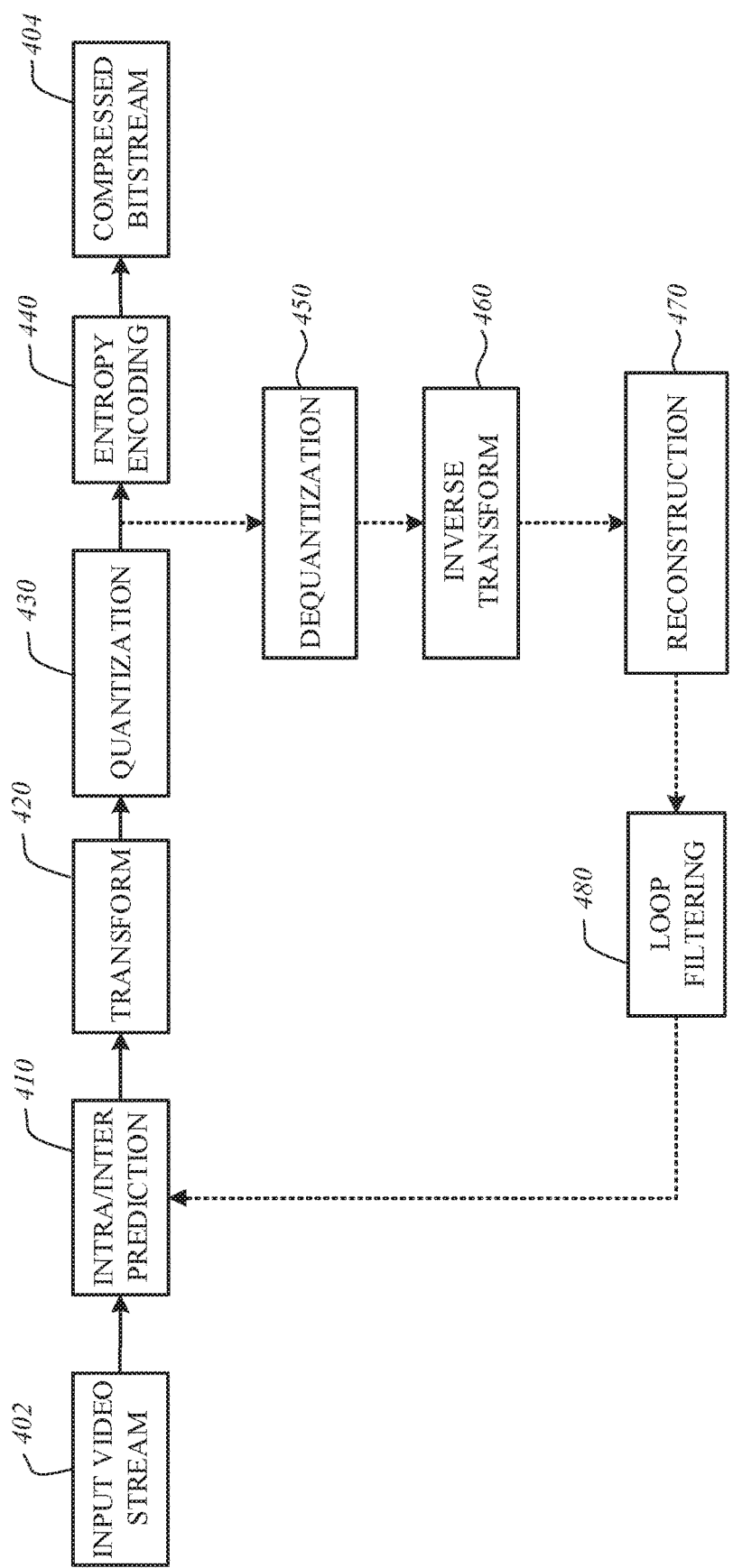
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to encode video data as described herein. The encoder 400 can be implemented as specialized hardware included, for example, in computing device 100.

The encoder 400 can encode a video stream 402, such as the video stream 300 shown in FIG. 3 to generate an encoded (compressed) bitstream 404. In some implementations, the encoder 400 may include a forward path for generating the compressed bitstream 404. The forward path may include an intra/inter-prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter-prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter-prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
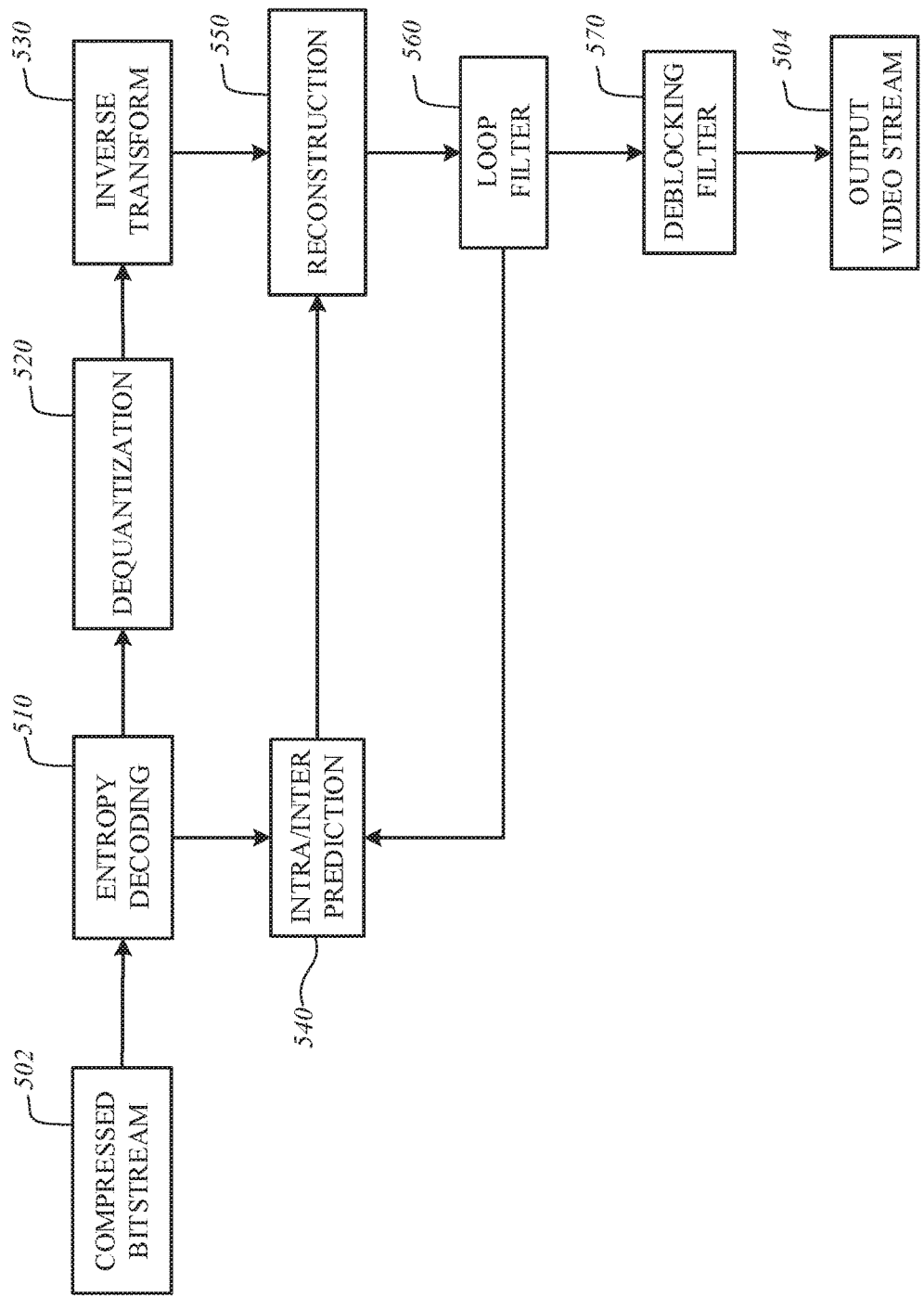
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter-prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter-prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transform unit 460 shown in FIG. 4. Using header information decoded from the compressed bitstream 502, the intra/inter-prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different portion, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block. In some implementations, more than one reference frame may be provided. For example, three reference frames may be selected from eight candidate reference frames.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two dimensional data structure such as a matrix, or in a one dimensional data structure, such as a vector array.

In some implementations, for inter-prediction, the encoder 400 may convey encoded information for prediction blocks at block end points, including but not limited to a prediction mode, the prediction reference frame(s), motion vector(s) if needed, subpixel interpolation filter type.

Figure 6:
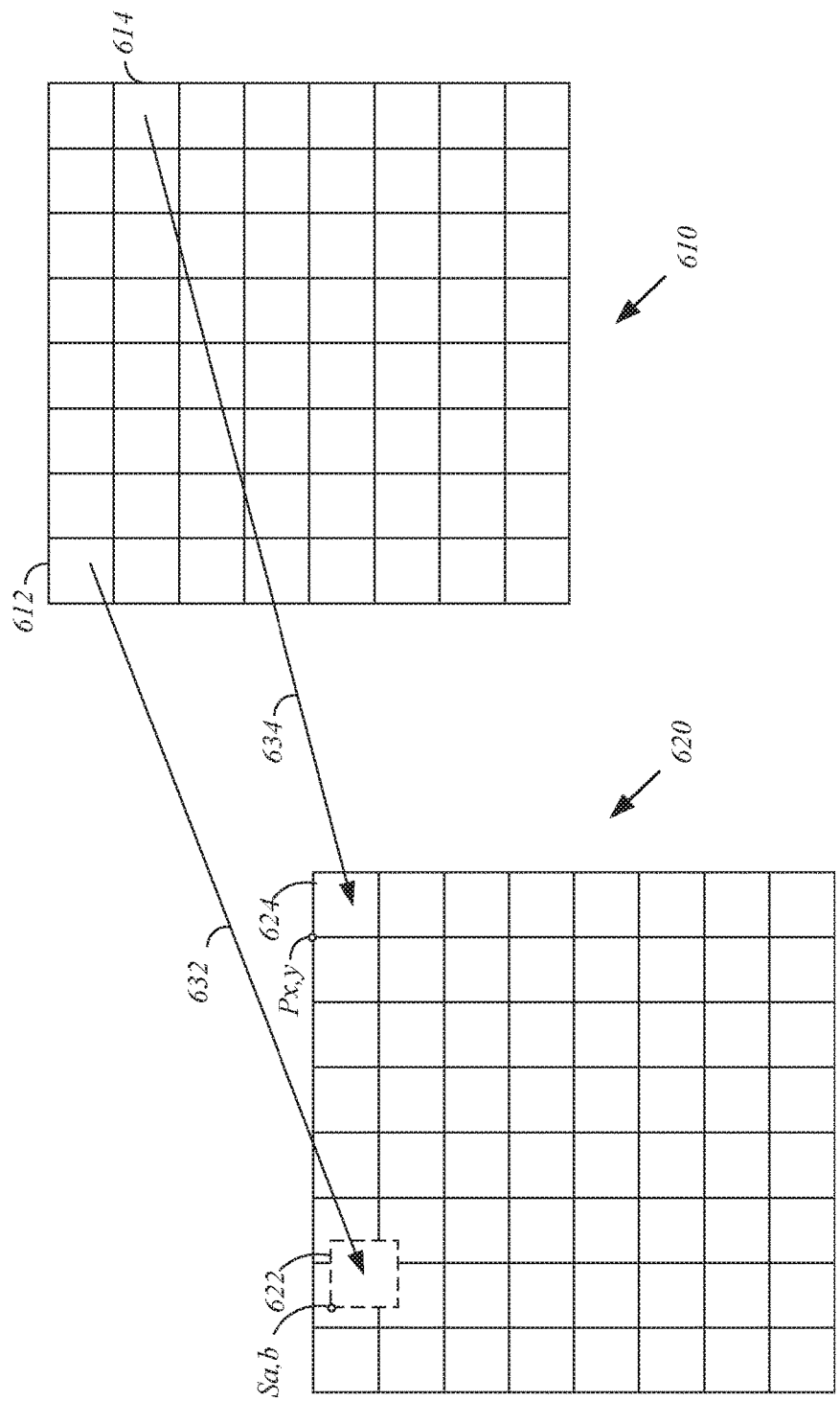
FIG. 6 is a block diagram of a motion vector having subpixel accuracy in accordance with implementations of this disclosure.

FIG. 6 is a block diagram of a representation of inter-prediction using a subpixel interpolation filter in accordance with implementations of this disclosure. In some implementations, inter-prediction using a subpixel interpolation filter may be implemented in a decoder, such as the decoder 500 shown in FIG. 5, an encoder, such as the encoder 400 shown in FIG. 4, or a combination thereof.

In some implementations, inter-prediction may include encoding a current frame 610, or a portion thereof, such as block 612 or block 614, with reference to a reference frame 620. For example, a motion vector 632/634 may indicate a spatial location of a reference block 622/624 in the reference frame 620 relative to the location of the corresponding block 612/614 in the current frame 610, the reference block 622/624 may be the portion of the reference frame 620 identified as most accurately matching the corresponding block 612/614 in the current frame 610, and the reference block 622/624 may be used to generate a prediction block for encoding the current frame 610.

In some implementations, the portion 622 of the reference frame 620 that most accurately matches a current block (e.g., the block 614) of the current frame 610 may be offset from block or pixel boundaries, and inter-prediction may include using a subpixel interpolation filter. For example, inter-prediction may include using motion vector precision of ½ pel, ¼ pel, or ⅛ pel, and a subpixel interpolation filter may be used.

In some implementations, coding a current block may include identifying a prediction mode from multiple candidate prediction modes for coding the current block. For example, a video coder may evaluate the candidate prediction modes, which may include intra-prediction modes, inter-prediction modes, or both, to identify the optimal prediction mode, which may be, for example, the prediction mode that minimizes an error metric, such as a rate-distortion cost, for the current block.

In some implementations, the inter-prediction modes may include a new motion vector mode (NewMV), a zero-motion vector mode (ZeroMV), a nearest motion vector mode (NearestMV), and a near motion vector mode (NearMV). The new motion vector mode (NewMV) may indicate that a new motion vector for the current block may be signaled expressly or explicitly in the encoded video stream. In some implementations, the new motion vector may be signaled differentially. For example, the new motion vector may be signaled using a difference between the new motion vector and a reference motion vector, such as a motion vector used for encoding a previously coded neighboring block. The zero-motion vector mode (ZeroMV) may indicate that a zero-motion vector, (0, 0), which may indicate no motion, may be used for predicting the current block, and an express or explicit motion vector for predicting the current block may be omitted from the encoded video stream. In some implementations, the nearest motion vector mode (NearestMV) may indicate that a motion vector used for encoding a neighboring previously encoded block identified as the nearest motion vector may be used for predicting the current block, and an express or explicit motion vector for predicting the current block may be omitted from the encoded video stream. In some implementations, the near motion vector mode (NearMV) may indicate that a motion vector used for encoding a neighboring previously encoded block identified as the near motion vector may be used for predicting the current block, and an express or explicit motion vector for predicting the current block may be omitted from the encoded video stream.

In some implementations, the encoder may identify candidate motion vectors for encoding the current block. For example, the candidate motion vectors may include the zero-motion vector, a new motion vector, a near motion vector, and a nearest motion vector. In some embodiments, the encoder may evaluate neighboring, or proximal, previously encoded blocks to identify the near motion vector and the nearest motion vector. For example, the near motion vector may be identified from a first neighboring, or proximal, previously encoded block, and may the nearest motion vector may be identified from a second neighboring, or proximal, previously encoded block.

In some implementations, the decoder may identify candidate motion vectors for decoding a current block. For example, the candidate motion vectors may include a near motion vector, and a nearest motion vector. In some embodiments, the decoder may evaluate neighboring, or proximal, previously decoded blocks to identify the near motion vector and the nearest motion vector. For example, the near motion vector may be identified from a first neighboring, or proximal, previously decoded block, and may the nearest motion vector may be identified from a second neighboring, or proximal, previously decoded block.

In some implementations, coding the current block may include identifying an interpolation filter for predicting the current block. For example, an interpolation filter may be selected from candidate interpolation filters. In some implementations, the candidate interpolation filters may be 1/16-pel precision filters, and may include a Bilinear filter, an 8-tap filter (EIGHTTAP), a sharp 8-tap filter (EIGHTTAP_SHARP), a smooth 8-tap filter (EIGHTTAP_SMOOTH), any other filter described herein (e.g., FILTER 2 and FILTER 3, described below), or a combination thereof.

In practice, as a person skilled in the art understands, interpolation filtering can be separated into two 1-dimensional filtering passes. For example, a first pass can perform interpolation filtering in the x-direction; and a second pass performs interpolation filtering in the y-direction. However, for simplicity of explanation, interpolation filtering is described herein with respect to 1-dimensional filtering only.

FIG. 7 is an illustration 700 of a bilateral filter in accordance with implementations of this disclosure. In an example, an encoder can use the bilateral filter during the motion estimation stage, such as described with respect to the intra/inter-prediction unit 410 of FIG. 4. In an example, and to ensure fast encoding and decoding, the intra/inter-prediction unit 410 and reconstruction unit 470 of FIG. 4 and the reconstruction unit 550 of FIG. 5 can use the 2-tap bilinear filter exclusively. The bilateral filter is referred to herein as FILTER 1.

A graph 710 illustrates the operation of the bilateral filter (i.e., FILTER 1). As shown in the graph 710, P0 and P1 are pixel values of two contiguous pixels. In an example, the pixel values P0 and P1 are in the same row (or, equivalently, column) of pixels (at integer or sub-pel locations) of a video block. For example, the pixel value P0 can be at a horizontal location x0 of the row of pixels; and the pixel value P1 can be at a horizontal location x1 of the row of pixels. The sub-pixel value P at location x is to be calculated (i.e., interpolated) from the pixel values P0 and P1. The sub-pixel value P can be calculated using formula (1).

$$P = P0*D(x,x1) + P1*D(x,x0) \quad (1)$$

The formula (1) can be described as a weighted summation of 2 nearby pixels. The weights (i.e., $D(x, x0)$ and $D(x, x1)$) are the normalized distances between the location x and the locations x0 and x1, respectively. For example, if x is halfway between x0 and x1, then the weights can be $D(x, x0)=D(x, x1)=0.5$. For example, if x is 1/4 of the way between x0 and x1 and closer to x0 than to x1, then the weights can be $D(x, x0)=0.25$ and $D(x, x1)=0.75$. That is, the distance (i.e., the weight) is indicative of the amount (i.e., how much) of one pixel is to be contributed to the interpolated value.

The formula (1) can be rewritten in a general form of formula 2, where F0 and F1 are filter coefficients:

$$P = (P0*F0) + (P1*F1) \quad (2)$$

The bilinear interpolation filter can be designed based on the corresponding pixel distances, as mentioned above. Assume the motion vector precision is 1/16 pixel, then the coefficients of the bilateral filter (i.e., FILTER 1) can be as shown in Table I.

TABLE I

FILTER 1 Weights

| Sub-pixel | X0 Weight | X1 Weight |
|---|---|---|
| Full-pixel | 128 | 0 |
| 1/16 pixel | 120 | 8 |
| 1/8 pixel | 112 | 16 |
| 3/16 pixel | 104 | 24 |
| 1/4 pixel | 96 | 32 |
| 5/16 pixel | 88 | 40 |
| 3/8 pixel | 80 | 48 |
| 7/16 pixel | 72 | 56 |
| 1/2 pixel | 64 | 64 |
| 9/16 pixel | 56 | 72 |
| 5/8 pixel | 48 | 80 |
| 11/16 pixel | 40 | 88 |
| 3/4 pixel | 32 | 96 |
| 13/16 pixel | 24 | 104 |
| 14/8 pixel | 16 | 112 |
| 15/16 pixel | 8 | 120 |

Note that, as it is desirable to perform integer operations during coding operations, the weights of FILTER 1 are represented as integers using 7-bit precision. Other integer precision can be used. To illustrate the use of the bilateral filter, assume that the two consecutive pixel values are P0=220 and P1=63. The sub-pixel at the ⅜ pixel location can be obtained by P(⅜ pixel)=(220*80+48*63)>>7, where ">>" is the right-shift operation. As such, P(⅜)=161. A person skilled in the art can easily determine the weights of the bilateral filter for sub-pixel precisions other than $\frac{1}{16}^{th}$ as described with respect to Table I.

The purpose of interpolation is to estimate the unknown sub-pixels from the nearby pixels. Interpolation attempts to reconstruct an original continuous image from the sampled image at the integer pixel locations. The reconstruction is a convolution process using a defined kernel. For example, the above bilinear interpolation filter uses a triangle kernel. A triangle filter is shown in a triangle kernel 720.

The triangle kernel 720 acts a linear interpolation filter by taking the weighted average of two neighboring values according to the distances of the sample to the two neighboring values. The convolution operation can be carried out as illustrated in the following examples. Centering a triangle kernel 722 directly over a full pixel location x0, the peak value of the triangle kernel 722 is a pixel value P0. The triangle kernel 722 shows the contribution of the pixel value P0 to the final interpolated pixel value at a sub-pixel location. Similarly, centering a triangle kernel 724 directly over a full pixel location x1, the peak value of the triangle kernel 724 is a pixel value P1. The triangle kernel 724 shows the contribution of the pixel value P1 to the final interpolated pixel value at a sub-pixel location. For example, as shown in FIG. 7, to calculate the sample that is at location x, namely ¾-pixel between x0 (having a pixel value of P0) and x1 (having a pixel value of P1), the contribution of P0 (namely, P0x) and the contribution of P1 (namely, P1x) are added together, where P0x32 P0*W0 and P1x=P1*W1. The weights to be used are W0=0.25 and W1=0.75 (or equivalently, 32 and 96 using 7-bit integer representations). As such, the convolution operation results in P=0.25P0+0.75P1.

A plot 730 plots the weights of the triangle kernel 720 of the above described bilateral filter (i.e., FILTER 1). The weights of the triangle kernel 720 form an isosceles triangle, as shown in the plot 730. As such, the bilateral filter can be characterized as a 2-tap filter with a set of weight tuples (see Table 1); and each tuple includes two weights and is used for sub-pixel interpolation at a respective sub-pixel location between a first pixel and a second pixel. For each tuple of the weight tuples, the two weights are based on a first distance between the sub-pixel location and the first pixel and a second distance between the sub-pixel location and the second distance. Said another way, a plot of the weight tuples of the bilateral filer forms a triangle (e.g., an isosceles triangle). The first pixel can be at an integer pixel location or a sub-pixel location. The second pixel can be at an integer pixel location or a sub-pixel location.

A graph 740 illustrates recovering a continuous portion 742 of an image (i.e., a frame, a block of a frame, etc.) given pixel value at four integer locations, x0-x3. Kernels 744-750 illustrate the triangular kernels used to derive (i.e., calculate, obtain, etc.) the continuous portion 742 from the pixel values at the four integer locations, x0-x3. Note that only one side of the kernel 748 and only of side of the kernel 750 are shown in the graph 740 because the other required pixel values (i.e., a pixel before x0 and a pixel after x3) are not shown in the graph 740.

As already mentioned, a kernel can provide the answer to the question: how much of the pixel value at a location is used in the interpolated pixel value? For example, and as can be seen in the graph 740, at x1 the pixel weight is 1 (indicated by the alignment of the center of the kernel 744 with the pixel location x1). The weights of x0 and x2 are zero. That is, the pixel values are locations x0 and x2 do not contribute any of their respective values to x1. Similarly, at x2 the pixel weight is 1 (indicated by the alignment of the center of the kernel 746 with the pixel location x2). For example, for a sub-pixel value at a location between x0 and x1, the respective values obtained along the kernels 744 and 748 can be added to obtain the pixel value on the continuous portion 742.

It is desirable to use kernels that provide close approximations of the ideal low-pass filter in the frequency domain. An ideal low-pass filter can be described as a filter that completely eliminates all frequencies above a cutoff frequency while passing, unchanged, those frequencies that are below the cutoff frequency. That is, an ideal low-pass filter recovers only those frequencies that are in the original image.

While the bilateral filter (i.e., FILTER 1) described above is a low complexity filter, it does not approximate sufficiently the ideal low-pass filter in the frequency domain. The Fourier transform of the triangle kernel is the $sinc^2$ function. The $sinc^2$ function includes many sidelobes and, therefore, high frequencies are introduced in the filtered results (i.e., the interpolated values). As such, the triangle kernel (e.g., the bilateral filter), being a 1-order filter, does not provide results that are as good as high order kernels.

Figure 8:
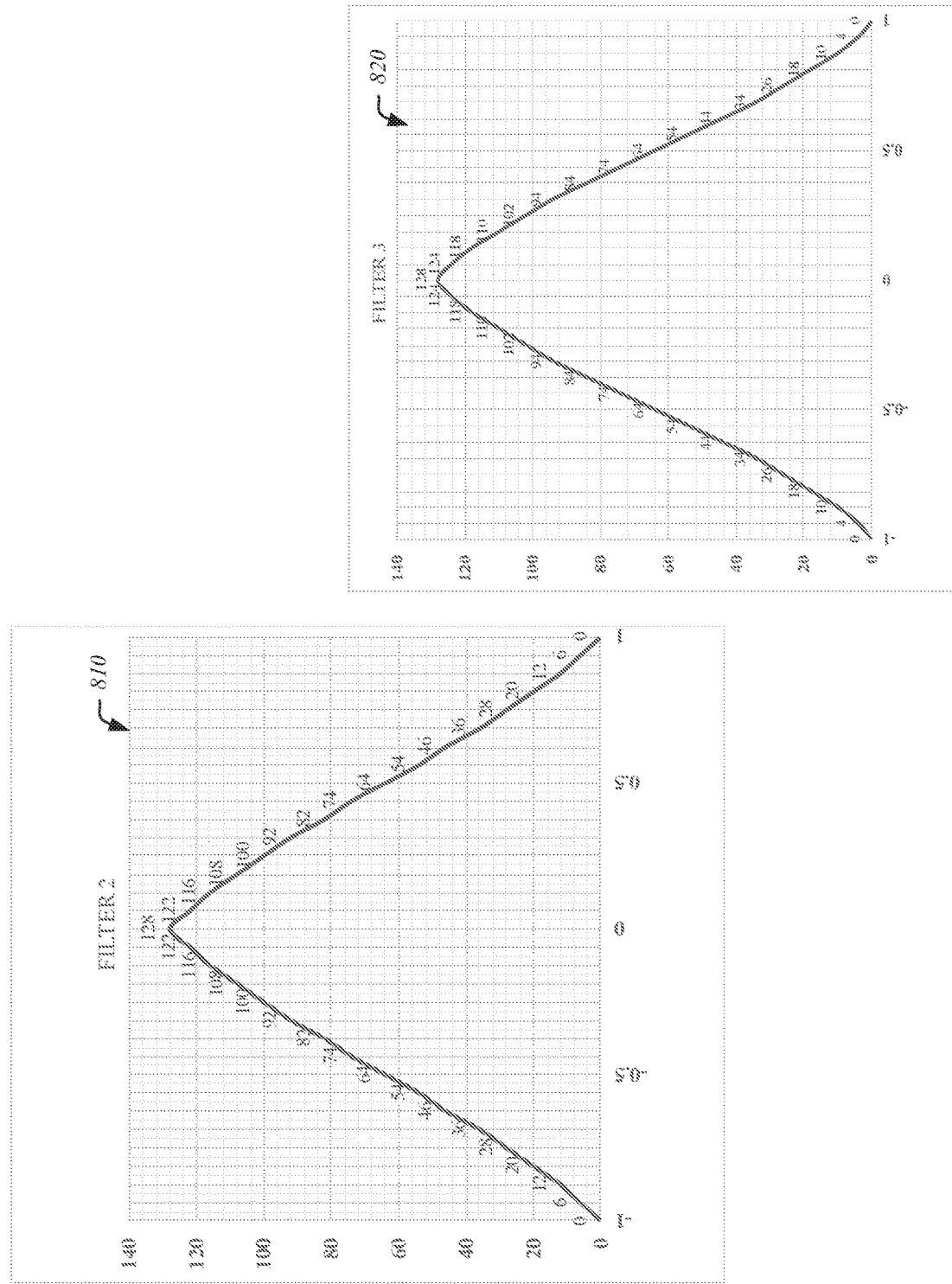
FIG. 8 illustrate 2-tap filters that resemble high order kernels in accordance with implementations of this disclosure.

FIG. 8 illustrate 2-tap filter kernels that resemble high order kernels in accordance with implementations of this disclosure. A filter kernel 810 and a filter kernel 820, referred to, respectively, as FILTER2 and FILTER3 are described. Each of the filter kernels 810 and 820 defines a 2-tap filter. Accordingly, each of the filter kernels 810 and 820 can only use two contiguous pixels in the interpolation operation. Resembling high order kernels can mean exhibiting similar response in the frequency domain.

As further described below, each of the filter kernels 810 and 820 can be characterized as a 2-tap filter with a set of weight tuples (see Tables II and III). Each tuple includes two weights and used for sub-pixel interpolation at a respective sub-pixel location between a first pixel and a second pixel. For at least some of the weight tuples, the two weights are not based on a first distance between the sub-pixel location and the first pixel and/or a second distance between the sub-pixel location and the second distance. Said another way, a plot (i.e., the filter kernel 810) of the weight tuples of the FILTER 2 does not form a triangle (e.g., an isosceles triangle, such as that described with respect to the plot 730); and a plot (i.e., the filter kernel 820) of the weight tuples of the FILTER 3 does not form a triangle. That is, the sides of each of the filter kernels 810 and 820 include curvatures and are not straight lines. The first pixel can be at an integer pixel location or a sub-pixel location. The second pixel can be at an integer pixel location or a sub-pixel location.

The weights of at least some of the tuples of the filter kernels 810 and 820 are not distributed based on the distance between the corresponding sub-pixel location and the pixel locations that are used in the interpolation operation.

Table II lists the weight tuples the filter kernel 810 (FILTER 2) at the given sub-pixel locations. Table III lists the weight tuples the filter kernel 820 (FILTER 3) at the given sub-pixel locations. Similar to the Table I, the weights of FILTER 2 and FILTER 3 are represented as integers using 7-bit precision.

TABLE II

FILTER 2 Weights

| Sub-pixel | X0 Weight | X1 Weight |
|---|---|---|
| Full-pixel | 128 | 0 |
| 1/16 pixel | 122 | 6 |
| 1/8 pixel | 116 | 12 |
| 3/16 pixel | 108 | 20 |
| 1/4 pixel | 100 | 28 |
| 5/16 pixel | 92 | 36 |
| 3/8 pixel | 82 | 46 |
| 7/16 pixel | 74 | 54 |
| 1/2 pixel | 64 | 64 |
| 9/16 pixel | 54 | 74 |
| 5/8 pixel | 46 | 82 |
| 11/16 pixel | 36 | 92 |
| 3/4 pixel | 28 | 100 |
| 13/16 pixel | 20 | 108 |
| 14/8 pixel | 12 | 116 |
| 15/16 pixel | 6 | 122 |

TABLE III

FILTER 3 Weights

| Sub-pixel | X0 Weight | X1 Weight |
|---|---|---|
| Full-pixel | 128 | 0 |
| 1/16 pixel | 124 | 4 |
| 1/8 pixel | 118 | 10 |
| 3/16 pixel | 110 | 18 |
| 1/4 pixel | 102 | 26 |
| 5/16 pixel | 94 | 34 |
| 3/8 pixel | 84 | 44 |
| 7/16 pixel | 74 | 54 |
| 1/2 pixel | 64 | 64 |
| 9/16 pixel | 54 | 74 |
| 5/8 pixel | 44 | 84 |
| 11/16 pixel | 34 | 94 |
| 3/4 pixel | 26 | 102 |
| 13/16 pixel | 18 | 110 |
| 14/8 pixel | 10 | 118 |
| 15/16 pixel | 4 | 124 |

FILTER 2 and FILTER 3 (illustrated with the filter kernel 810 and the filter kernel 820, respectively) are weight-redistributed triangle kernels. FILTER 2 and FILTER 3 are so called (i.e., weight-redistributed triangle kernels) because, while the general shape may resemble a triangle, the weights are redistributed so that for at least some of the weight tuples, a higher weight is allocated to the closer pixel than the weight assigned to that pixel by FILTER 1. It is to be understood, with respect to Tables I-III, that X0 and X1 refer to locations of the two pixels values being interpolated. The sub-pixel location is given with respect to the first pixel location (i.e., X0).

As an illustrative example of the weight-redistribution, and using the ¼ pixel resolution, whereas FILTER 1 uses the weight tuple (96, 32), FILTER 2 uses (100, 28) thereby assigning a higher weight (i.e., 100 is higher than 96) to the closer pixel (i.e., x0); and FILTER 3 uses (102, 26) thereby assigning a higher weight (i.e., 102 is higher than 96) to the closer pixel (i.e., x0). As another example of the weight-redistribution, and using the ¾ pixel resolution, whereas the FILTER 1 uses the weight tuple (32, 96), FILTER 2 uses (28, 100) thereby assigning a higher weight (i.e., 100 is higher than 96) to the closer pixel (i.e., x1); and FILTER 3 uses (26, 102) thereby assigning a higher weight (i.e., 102 is higher than 96) to the closer pixel (i.e., x1).

The Fourier transform of FILTER 2 has less high frequencies than that of the triangle kernel (i.e., FILTER 1). As such, better coding performance can be achieved using FILTER 2 than the triangle kernel. To design a filter that is similar to FILTER 2 (e.g., a weight-redistributed triangle filter) a relatively high cut-off frequency (C) can be selected. The cut-off frequency can be 0.5, 0.75, or other cut-off frequencies. A cut-off frequency of C=0.75 was used in the design of FILTER 2. FILTER 2 provides a "sharper" response that the bilateral filter (i.e., FILTER 1). As such, FILTER 2 can, similar to the sharp interpolation filter (EIGHTTAP_SHARP), better conserve the edges in the video frame than the bilateral filer. FILTER 3 is a Gaussian-like kernel. Since the Fourier transform of a Gaussian filter is a Gaussian, FILTER 3 can be considered a good low-pass filter. While weight redistribution techniques are described with respect to FILTER 2 and FILTER 3, other techniques can be used to obtain 2-tap filters with weights that are, unlike FILTER 1, not based on pixel distances, at least for some of the sub-pixel locations.

Figure 9:
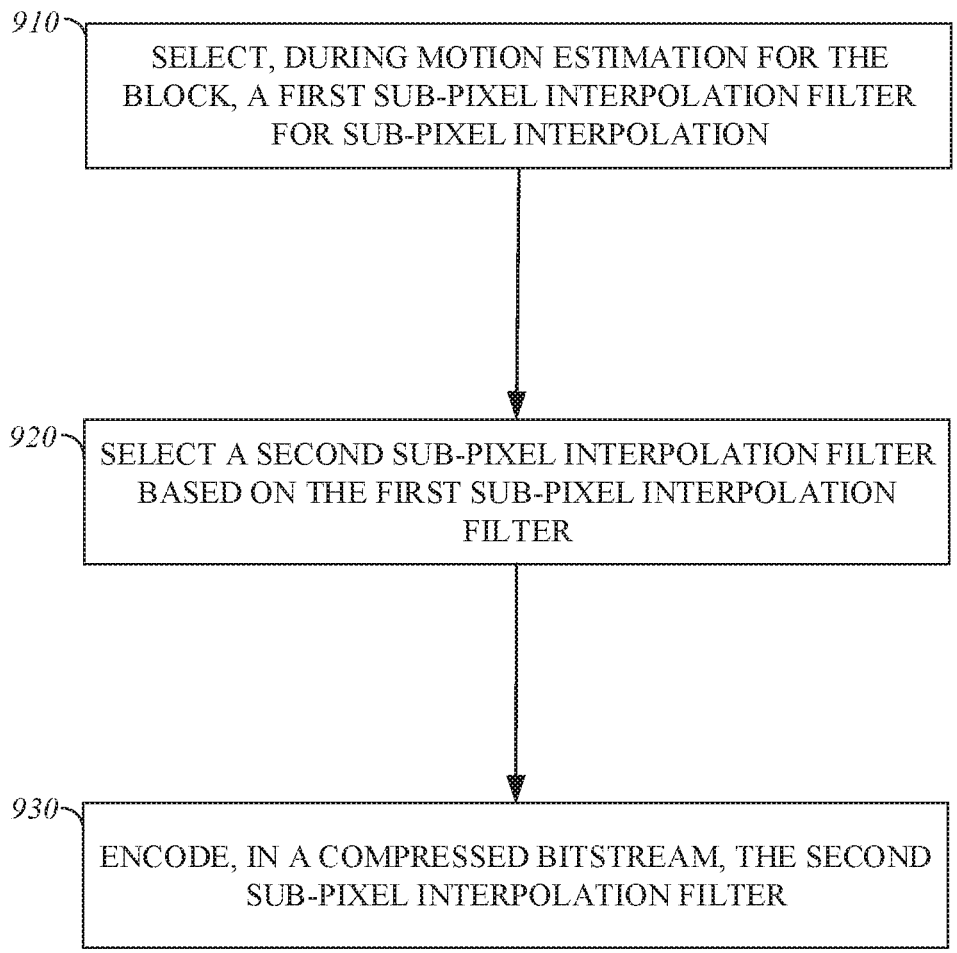
FIG. 9 is a flowchart diagram of an example of a process for encoding a block of a video using inter prediction in accordance with implementations of this disclosure.

FIG. 9 is a flowchart diagram of an example of a process 900 for encoding a block of a video using inter prediction in accordance with implementations of this disclosure. The block is encoded using inter prediction. In some implementations, encoding a block of a video using inter prediction can be implemented in an encoder, such as the encoder 400 shown in FIG. 4.

In an example, and at a high level, a reference block may be identified in a reference frame based on a motion vector, and a prediction block may be generated from the reference block using an interpolation filter. In some implementations, a residual, or prediction error, between the block and the prediction block may be included in a compressed bitstream, such as the compressed bitstream 404 of FIG. 4. In some implementations, the motion vector and an identifier of the interpolation filter used for coding the block can be included in the compressed bitstream, such as in a header for the first block. In some implementations, the motion vector for coding the block may be associated with the interpolation filter for coding the block.

In an example, and as is known, inter prediction in an encoder can entail two separate processes: a motion estimation process and a motion compensation process. The motion estimation process can be performed by a prediction unit, such as the intra/inter-prediction unit 410 of FIG. 4. The motion compensation process can be performed by a reconstruction unit, such as the reconstruction unit 470 of FIG. 4.

During the motion estimation process, a motion vector can be determined for the block. In some implementations, encoding the block can include identifying the motion vector for encoding the block. In some implementations, the motion vector can be identified for encoding the block and an interpolation filter can be identified for encoding the block. In an example, the interpolation filter can be identified when the motion vector has sub-pixel accuracy. As such, samples (i.e., pixel values) at fractional positions can be interpolated using the samples (i.e., pixel values) at the integer pixel positions.

An interpolation filter is used in the interpolation process. Several filters can be available. In an example, the available interpolation filters (i.e., candidate interpolation filters) during motion estimation can include the EIGHTTAP_SMOOTH, the EIGHTTAP_SHARP, the EIGHTTAP, the FILTER 1, the FILTER 2, and the FILTER 3, which are described above. In another example, more, fewer, or other filters can be available.

In some implementations, identifying an interpolation filter for encoding the block can be based on the motion vector identified for encoding the block. In some implementations, identifying the interpolation filter can include evaluating candidate interpolation filters to identify an optimal interpolation filter. In an example, each of the available candidate interpolation filters can be evaluated to determine the optimal interpolation filter. The optimal interpolation filter can be the filter that results in the smallest residual error between the block and the prediction block.

In another example, only some of the candidate interpolation filters are evaluated. As described above, EIGHTTAP_SMOOTH, the EIGHTTAP_SHARP, and the EIGHTTAP are 8-tap filters; whereas FILTER 1, the FILTER 2, and the FILTER 3 are 2-tap filters. For some applications (e.g., video conferencing, screen sharing, etc.) only the 2-tap filters are evaluated. This is so to improve the compression speed even if at the cost of lower quality compression. More generally, shorter filters are evaluated during the motion estimation process. As such, an identifier of the selected interpolation filter is included in the compressed bitstream.

In some encoding examples, fast search motion estimation techniques can be used. Such fast motion estimation techniques can include using shorter filters (e.g., 2-tap filters, such as FILTER 1, FILTER 2, and FILTER 3) during the motion estimation phase, but using a corresponding longer filter during motion compensation, as further described below.

Using one of the FILTER 1, FILTER 2, and FILTER 3 can include identifying the desired sub-pixel precision of the motion vector and using the corresponding weight tuple. For example, if desired sub-pixel precision is ⅜ pixel, then using FILTER 2 as the interpolation filter includes selecting the weight tuple (82, 46), as shown in Table II, for the interpolation operation.

In an example, there may be a correspondence between shorter filters and the longer filters. That is, a shorter filter can have a similar or approximate frequency response to a corresponding longer filter. As such, when a shorter filter is selected during motion estimation, the corresponding longer filter can be encoded (e.g., included) in the compressed bitstream so that a decoder can use the longer filter for decoding. In another example, the correspondence may not be based on frequency response similarities. Encoding an interpolation filter in the compressed bitstream can mean encoding an indication, an identifier, or the like of the interpolation filter in the compressed bitstream. In an example, if FILTER 2 is selected during the motion estimation phase, then the EIGHTTAP_SHARP filter can be encoded in the compressed bitstream. In an example, if FILTER 3 is selected during the motion estimation phase, and even though the correspondence between FILTER 3 and the EIGHTTAP_SMOOTH may be weaker than the correspondence between FILTER 2 and the EIGHTTAP_SHARP filter, then the EIGHTTAP_SMOOTH filter can be encoded in the compressed bitstream. In an example, if FILTER 1 is selected during the motion estimation phase, then the EIGHTTAP filter can be encoded in the compressed bitstream. Other correspondences between shorter and longer filters are possible.

During the motion compensation phase, the motion vector, the interpolation filter, and the residual are decoded from the compressed bitstream and used to reconstruct the block.

Returning to the process 900, at 910, the process 900 selects a first sub-pixel interpolation filter. The first sub-pixel interpolation filter can be selected during motion estimation for the block, as described above. The first sub-pixel interpolation filter can be used for sub-pixel interpolation of fractional motion (i.e., at a sub-pixel location).

The first sub-pixel interpolation filter can be a 2-tap filter. As such, the first sub-pixel interpolation filter can be one of FILTER 2 or FILTER 3, which are described above, or any other weight-redistributed triangle kernel that exhibits the characteristics described herein. As further described above, such as in Tables II and III, the first sub-pixel interpolation filter includes weight tuples. Each weight tuple includes two weights and is used for sub-pixel interpolation at a respective sub-pixel location between a first pixel and a second pixel. In an example, the first pixel and the second pixel can be pixels at integer pixel locations. In an example, at least one of the first pixel or the second pixel can be at a sub-pixel location. That is, at least one of the first pixel or the second pixel can itself be an interpolated pixel. In an example, the interpolation can be divided into multiple stages. As such, for example, a first interpolation operation interpolates ½ pixel values from the full pixel neighboring pixels, and a second interpolation operation further interpolates other sub-pixel values using the ½ pixel values.

As mentioned, the first sub-pixel interpolation filter can be FILTER 2. As such, and using 7-bit precision, and as described in Table II, the weight tuples include the tuples (128, 0), (122, 6), (116, 12), (108, 20), (100, 28), (92, 36), (82, 46), (74, 54), (64, 64), (54, 74), (46, 82), (36, 92), (28, 100), (20, 108), (12, 116), and (6, 122) for, respectively, sub-pixel precisions of full pixel, 1/16 pixel, ⅛ pixel, 3/16 pixel, ¼ pixel, 5/16 pixel, ⅜ pixel, 7/16 pixel, ½ pixel, 9/16 pixel, ⅝ pixel, 11/16 pixel, ¾ pixel, 13/16 pixel, ⅞ pixel, and 15/16 pixel.

As mentioned, the first sub-pixel interpolation filter can be FILTER 3. As such, and using 7-bit precision, and as described in Table III, the weight tuples include the tuples (128, 0), (124, 4), (118, 10), (110, 18), (102, 26), (94, 34), (84, 44), (74, 54), (64, 64), (54, 74), (44, 84), (34, 94), (26, 102), (18, 110), (10, 118), and (4, 124) for respective sub-pixel precisions of full pixel, 1/16 pixel, ⅛ pixel, 3/16 pixel, ¼ pixel, 5/16 pixel, ⅜ pixel, 7/16 pixel, ½ pixel, 9/16 pixel, ⅝ pixel, 11/16 pixel, ¾ pixel, 13/16 pixel, ⅞ pixel, and 15/16 pixel.

As mentioned above, the weight tuples of the bilateral (i.e., FILTER 1), and as described with respect to FIG. 7, are such that the weights are inversely proportional to the distance between the interpolation location (i.e., the sub-pixel location) and the locations of the pixels using in the interpolation. Contrastingly, a characteristic of the first sub-pixel interpolation is that, for at least one weight tuple of the weight tuples, the two weights are not based on a first distance between the sub-pixel location and the first pixel and a second distance between the sub-pixel location and the second pixel.

In an example, and as described above, the first sub-pixel interpolation can be such that the weights are redistributed so that for at least some of the weight tuples, a higher weight is allocated to the closer pixel than the weight assigned to that pixel by FILTER 1. Said another way, in case that the sub-pixel location is closer to the first pixel than the second pixel, for at least the one weight tuple of the weight tuples, a first weight of the one weight tuple, the first weight is used for the first pixel, is higher than a bilateral weight that is based on the second distance.

In an example, selecting the first sub-pixel interpolation filter can include selecting, during the motion estimation for the block, a motion vector having a fractional resolution and using the first sub-pixel interpolation filter for determining interpolated values at the fractional resolution to generate a prediction block.

At 920, the process 900 selects a second sub-pixel interpolation filter. The second sub-pixel interpolation filter can be based on the first sub-pixel interpolation filter. In an example, the second sub-pixel interpolation filter can be used during the motion compensation process, such as by a reconstruction unit of the encoder. In an example, the second sub-pixel interpolation filter can be the first sub-pixel interpolation filter. In an example, the second sub-pixel interpolation filter can be selected based on a rate-distortion cost. For example, the second sub-pixel interpolation filter can be the one of the longer interpolation filters that results in the least rate-distortion cost. In an example, the second sub-pixel interpolation filter can be selected based on a frequency response of the first sub-pixel interpolation filter. For example, the second sub-pixel interpolation filter can be selected based on a correspondence between the first interpolation filter and the second interpolation filter.

At 930, the process 900 encodes, in the compressed bitstream, the second sub-pixel interpolation filter. For example, the process 900 can encode an identifier of the second sub-pixel interpolation filter.

Figure 10:
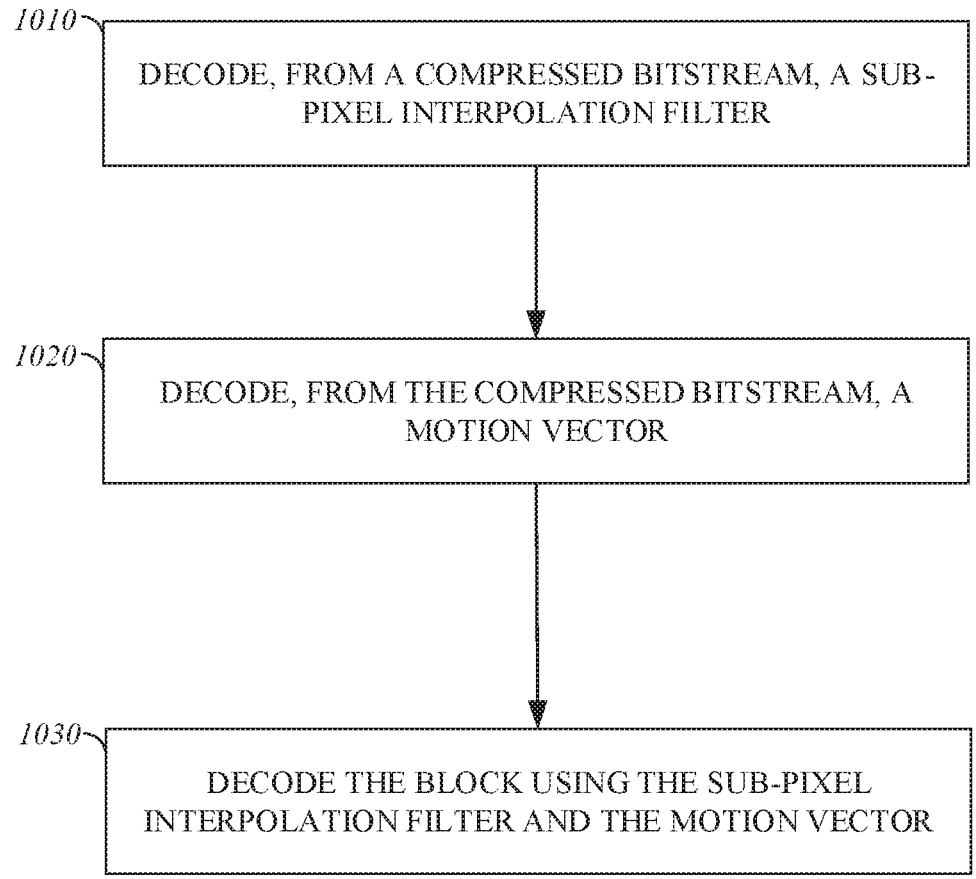
FIG. 10 is a flowchart diagram of an example of a process for decoding a block of a video using inter prediction in accordance with implementations of this disclosure.

FIG. 10 is a flowchart diagram of an example of a process 1000 for decoding a block of a video using inter prediction in accordance with implementations of this disclosure. In some implementations, decoding a block of a video using inter prediction can be implemented in a decoder, such as the decoder 500 shown in FIG. 5. In some implementations, decoding a block of a video using inter prediction can be implemented at least partially in an encoder, such as by a reconstruction unit of the encoder, such as the reconstruction unit 470 of FIG. 4.

Decoding the block can include decoding, from a compressed bitstream, a motion vector for decoding the block. In some implementations, decoding the block can include decoding, from the compressed bitstream, a motion vector and an identifier of an interpolation filter, such as a subpixel interpolation filter for decoding the block. In some implementations, decoding the block can include decoding, from the compressed bitstream, a residual, or prediction error for the block. In some implementations, decoding the block can include identifying a reference block in a reference frame based on the decoded motion vector, generating a predicted block from the reference block using the interpolation filter indicated by the decoded interpolation filter identifier, and generating a reconstructed block by adding the decoded residual to the predicted block. In some implementations, the motion vector, the identifier of the interpolation filter, or a combination thereof, can be decoded, from a header for the block in the compressed bitstream. In some implementations, the reconstructed block may be included in an output, such as an output for presentation. The compressed bitstream can be as described with respect to the compressed bitstream 502 of FIG. 5. The compressed bitstream can be as described with respect to a bitstream that is received by a reconstruction path, such as the reconstruction path described with respect to FIG. 4.

At 1010, the process 1000 decodes, from the compressed bitstream, a sub-pixel interpolation filter. The sub-pixel interpolation filter can be used for sub-pixel interpolation of fractional motion. The sub-pixel interpolation filter can be a 2-tap filter. The sub-pixel interpolation filter includes weight tuples. Each tuple includes two weights and is used for sub-pixel interpolation at a sub-pixel location between a first pixel and a second pixel. For at least one weight tuple of the weight tuples, the two weights are not based on a first distance between the sub-pixel location and the first pixel and a second distance between the sub-pixel location and the second pixel. This is to be contrasted with the weight tuples of the bilateral filter (FILTER 1).

In an example, and as described above, the sub-pixel interpolation can be such that the weights are redistributed so that for at least some of the weight tuples, a higher weight is allocated to the closer pixel than the weight assigned to that pixel by FILTER 1. Said another way, in case that the sub-pixel location is closer to the first pixel than the second pixel, for at least the one weight tuple of the weight tuples, a first weight of the one weight tuple, where the first weight is used for the first pixel, is higher than a bilateral weight that is based on the second distance.

The sub-pixel interpolation filter can be FILTER 2. As such, and using 7-bit precision, and as described in Table II, the weight tuples include the tuples (128, 0), (122, 6), (116, 12), (108, 20), (100, 28), (92, 36), (82, 46), (74, 54), (64, 64), (54, 74), (46, 82), (36, 92), (28, 100), (20, 108), (12, 116), and (6, 122) for, respectively, sub-pixel precisions of full pixel, $\frac{1}{16}$ pixel, $\frac{1}{8}$ pixel, $\frac{3}{16}$ pixel, $\frac{1}{4}$ pixel, $\frac{5}{16}$ pixel, $\frac{3}{8}$ pixel, $\frac{7}{16}$ pixel, $\frac{1}{2}$ pixel, $\frac{9}{16}$ pixel, $\frac{5}{8}$ pixel, $\frac{11}{16}$ pixel, $\frac{3}{4}$ pixel, $\frac{13}{16}$ pixel, $\frac{7}{8}$ pixel, and $\frac{15}{16}$ pixel.

The sub-pixel interpolation filter can be FILTER 3. As such, and using 7-bit precision, and as described in Table III, the weight tuples include the tuples (128, 0), (124, 4), (118, 10), (110, 18), (102, 26), (94, 34), (84, 44), (74, 54), (64, 64), (54, 74), (44, 84), (34, 94), (26, 102), (18, 110), (10, 118), and (4, 124) for respective sub-pixel precisions of full pixel, $\frac{1}{16}$ pixel, $\frac{1}{8}$ pixel, $\frac{3}{16}$ pixel, $\frac{1}{4}$ pixel, $\frac{5}{16}$ pixel, $\frac{3}{8}$ pixel, $\frac{7}{16}$ pixel, $\frac{1}{2}$ pixel, $\frac{9}{16}$ pixel, $\frac{5}{8}$ pixel, $\frac{11}{16}$ pixel, $\frac{3}{4}$ pixel, $\frac{13}{16}$ pixel, $\frac{7}{8}$ pixel, and $\frac{15}{16}$ pixel.

At 1020, the process 1000 decodes a motion vector from the compressed bitstream. At 1030, the process 1000 decodes the block using the sub-pixel interpolation filter and the motion vector. For example, decoding the motion vector can include identifying a reference frame. Using the reference frame, the motion index, and the sub-pixel interpolation filter, a prediction block can be generated. Additionally, a residual can be decoded from the compressed bitstream. The residual can be added to the prediction block to reconstruct the block.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods or processes disclosed herein can occur in various orders and/or concurrently. Additionally, elements of the methods disclosed herein may occur with other elements not explicitly presented and described herein. Furthermore, not all elements of the methods described herein may be required to implement a method or process in accordance with the disclosed subject matter.

The implementations of the transmitting station 100A and/or the receiving station 100B (and the algorithms, methods, instructions, executable instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for encoding a block of a video using inter prediction, the method comprising:
   selecting, during motion estimation for the block, a first sub-pixel interpolation filter for sub-pixel interpolation of fractional motion,
      wherein the first sub-pixel interpolation filter is a 2-tap filter,
      wherein the first sub-pixel interpolation filter comprises weight tuples, each weight tuple consisting of two weights and used for sub-pixel interpolation at a sub-pixel location between a first pixel and a second pixel, the sub-pixel location corresponding to a sub-pixel precision,
      wherein the first pixel and the second pixel being at integer pixel locations,
      wherein the sub-pixel location being on a same row or column between the first pixel and the second pixel,
      wherein for at least one weight tuple of the weight tuples, the two weights are not based on a first distance between the sub-pixel location and the first pixel and a second distance between the sub-pixel location and the second pixel
      wherein the first sub-pixel interpolation filter is designed to approximate a response of a filter that is used during motion compensation and that includes more than 2 taps,
      wherein the first sub-pixel interpolation filter is designed to pass fewer high frequencies than a triangular filter,
      wherein the triangular filter comprises triangular-filter weight tuples, each triangular-filter weight tuple consisting of a respective first triangular-filter weight and a respective second triangular-filter weight and used for sub-pixel interpolation at a respective sub-pixel location between the first pixel and the second pixel, the respective sub-pixel location corresponding to a respective sub-pixel precision,
      wherein the respective first triangular-filter weight is inversely proportional to a distance between a respective sub-pixel location and the first pixel at the integer location, and the respective second triangular-filter weight is inversely proportional to a distance between the respective sub-pixel location and the second pixel at the integer location,
      wherein the first sub-pixel interpolation filter and the triangular filter have same weights for at least one first sub-pixel location,
      wherein the first sub-pixel interpolation filter and the triangular filter have different weights for at least one second sub-pixel location,
      wherein a first interpolation-filter weight of the weight tuple of the first sub-pixel interpolation filter is less than a first triangular-filter weight of a triangular-filter weight tuple of the triangular filter for the second sub-pixel location, and a second interpolation-filter weight of the weight tuple of the first sub-pixel interpolation filter is more than a second triangular-filter weight of the triangular-filter weight tuple of the triangular filter for the second sub-pixel location;

selecting, during motion compensation, a second sub-pixel interpolation filter based on the first sub-pixel interpolation filter; and encoding, in a compressed bitstream, the second sub-pixel interpolation filter.

2. The method of claim 1, wherein in case that the sub-pixel location is closer to the first pixel than the second pixel, for at least the one weight tuple of the weight tuples, a first weight of the one weight tuple, wherein the first weight is used for the first pixel, is higher than a bilateral weight that is based on the second distance.

3. The method of claim 1, wherein selecting, during the motion estimation for the block, the first sub-pixel interpolation filter for the sub-pixel interpolation of fractional motion comprising:

selecting, during the motion estimation for the block, a motion vector having a fractional resolution; and using the first sub-pixel interpolation filter for determining interpolated values at the fractional resolution to generate a prediction block.

4. The method of claim 1, wherein the second sub-pixel interpolation filter is the first sub-pixel interpolation filter.

5. The method of claim 1, wherein the second sub-pixel interpolation filter is selected based on a frequency response of the first sub-pixel interpolation filter.

6. The method of claim 1, wherein the second sub-pixel interpolation filter is selected based on a correspondence between the first sub-pixel interpolation filter and the second sub-pixel interpolation filter.

7. The method of claim 1, wherein, in a case of a 7-bit precision, the weight tuples comprise (128, 0), (122, 6), (116, 12), (108, 20), (100, 28), (92, 36), (82, 46), (74, 54), (64, 64), (54, 74), (46, 82), (36, 92), (28, 100), (20, 108), (12, 116), and (6, 122) for respective sub-pixel precisions of full pixel, 1/16 pixel, 1/8 pixel, 3/16 pixel, 1/4 pixel, 5/16 pixel, 3/8 pixel, 7/16 pixel, 1/2 pixel, 9/16 pixel, 5/8 pixel, 11/16 pixel, 3/4 pixel, 13/16 pixel, 7/8 pixel, and 15/16 pixel.

8. The method of claim 1, wherein, in a case of a 7-bit precision, the weight tuples comprise (128, 0), (124, 4), (118, 10), (110, 18), (102, 26), (94, 34), (84, 44), (74, 54), (64, 64), (54, 74), (44, 84), (34, 94), (26, 102), (18, 110), (10, 118), and (4, 124) for respective sub-pixel precisions of full pixel, 1/16 pixel, 1/8 pixel, 3/16 pixel, 1/4 pixel, 5/16 pixel, 3/8 pixel, 7/16 pixel, 1/2 pixel, 9/16 pixel, 5/8 pixel, 11/16 pixel, 3/4 pixel, 13/16 pixel, 7/8 pixel, and 15/16 pixel.

9. An apparatus for encoding a block of a video using inter prediction, the apparatus comprising:

a processor; and a memory, the memory includes instructions executable by the processor to:

select, during motion estimation for the block, a first sub-pixel interpolation filter for sub-pixel interpolation of fractional motion, wherein the first sub-pixel interpolation filter is a 2-tap filter, wherein the first sub-pixel interpolation filter comprises weight tuples, each weight tuple consisting of two weights and used for sub-pixel interpolation at a sub-pixel location between a first pixel and a second pixel, the sub-pixel location corresponding to a sub-pixel precision, wherein the first pixel and the second pixel being at integer pixel locations, wherein the sub-pixel location being on a same row or column between the first pixel and the second pixel, wherein for at least one weight tuple of the weight tuples, the two weights are not based on a first distance between the sub-pixel location and the first pixel and a second distance between the sub-pixel location and the second pixel, wherein the first sub-pixel interpolation filter is designed to pass fewer high frequencies than a triangular filter, wherein the triangular filter comprises triangular-filter weight tuples, each triangular-filter weight tuple consisting of a respective first triangular-filter weight and a respective second triangular-filter weight and used for sub-pixel interpolation at a respective sub-pixel location between the first pixel and the second pixel, the respective sub-pixel location corresponding to a respective sub-pixel precision, wherein the respective first triangular-filter weight is inversely proportional to a distance between a respective sub-pixel location and the first pixel at the integer location, and the respective second triangular-filter weight is inversely proportional to a distance between the respective sub-pixel location and the second pixel at the integer location, wherein the first sub-pixel interpolation filter and the triangular filter have same weights for at least one first sub-pixel location, wherein the first sub-pixel interpolation filter and the triangular filter have different weights for at least one second sub-pixel location, wherein a first interpolation-filter weight of the weight tuple of the first sub-pixel interpolation filter is less than a first triangular-filter weight of a triangular-filter weight tuple of the triangular filter for the second sub-pixel location, and a second interpolation-filter weight of the weight tuple of the first sub-pixel interpolation filter is more than a second triangular-filter weight of the triangular-filter weight tuple of the triangular filter for the second sub-pixel location:

select a second sub-pixel interpolation filter based on a rate-distortion cost; and encode, in a compressed bitstream, the second sub-pixel interpolation filter.

10. The apparatus of claim 9, wherein the instructions further include instructions to:

use the second sub-pixel interpolation filter during motion compensation.

11. The apparatus of claim 9, wherein in case that the sub-pixel location is closer to the first pixel than the second pixel, for at least the one weight tuple of the weight tuples, a first weight of the one weight tuple and used for the first pixel is higher than a bilateral weight that is based on the second distance.

12. The apparatus of claim 9, wherein to select, during the motion estimation for the block, the first sub-pixel interpolation filter for the sub-pixel interpolation of fractional motion comprises to:

select, during the motion estimation for the block, a motion vector having a fractional resolution; and use the first sub-pixel interpolation filter for determining interpolated values at the fractional resolution.

13. The apparatus of claim 9, wherein the second sub-pixel interpolation filter is the first sub-pixel interpolation filter.

14. The apparatus of claim 9, wherein the second sub-pixel interpolation filter is selected based on a frequency response of the first sub-pixel interpolation filter.

15. The apparatus of claim 9, wherein, in a case of a 7-bit precision, the weight tuples comprise (128, 0), (122, 6), (116, 12), (108, 20), (100, 28), (92, 36), (82, 46), (74, 54), (64, 64), (54, 74), (46, 82), (36, 92), (28, 100), (20, 108), (12, 116), and (6, 122) for respective sub-pixel precisions of full pixel, 1/16 pixel, 1/8 pixel, 3/16 pixel, 1/4 pixel, 5/16 pixel, 3/8 pixel, 7/16 pixel, 1/2 pixel, 9/16 pixel, 5/8 pixel, 11/16 pixel, 3/4 pixel, 13/16 pixel, 7/8 pixel, and 15/16 pixel.

16. The apparatus of claim 9, wherein, in a case of a 7-bit precision, the weight tuples comprise (128, 0), (124, 4), (118, 10), (110, 18), (102, 26), (94, 34), (84, 44), (74, 54), (64, 64), (54, 74), (44, 84), (34, 94), (26, 102), (18, 110), (10, 118), and (4, 124) for respective sub-pixel precisions of full pixel, 1/16 pixel, 1/8 pixel, 3/16 pixel, 1/4 pixel, 5/16 pixel, 3/8 pixel, 7/16 pixel, 1/2 pixel, 9/16 pixel, 5/8 pixel, 11/16 pixel, 3/4 pixel, 13/16 pixel, 7/8 pixel, and 15/16 pixel.

17. An apparatus for decoding a block of a video using inter prediction, the apparatus comprising:
a processor configured to:
decode, from an encoded bitstream, a sub-pixel interpolation filter, the sub-pixel interpolation filter used for sub-pixel interpolation of fractional motion,
wherein the sub-pixel interpolation filter is a 2-tap filter,
wherein the sub-pixel interpolation filter comprises weight tuples, each weight tuple consisting of two weights and used for sub-pixel interpolation at a sub-pixel location between a first pixel and a second pixel,
wherein the first pixel and the second pixel being at integer pixel locations,
wherein the sub-pixel location being on a same row or column between the first pixel and the second pixel,
wherein for at least one weight tuple of the weight tuples, the two weights are not based on a first distance between the sub-pixel location and the first pixel and a second distance between the sub-pixel location and the second pixel,
wherein the each weight tuple corresponds to a respective sub-pixel precision,
wherein the sub-pixel interpolation filter is designed to pass fewer high frequencies than a triangular filter,
wherein the triangular filter comprises triangular-filter weight tuples, each triangular-filter weight tuple consisting of a respective first triangular-filter weight and a respective second triangular-filter weight and used for sub-pixel interpolation at a respective sub-pixel location between the first pixel and the second pixel, the respective sub-pixel location corresponding to a respective sub-pixel precision,
wherein the respective first triangular-filter weight is inversely proportional to a distance between a respective sub-pixel location and the first pixel at the integer location, and the respective second triangular-filter weight is inversely proportional to a distance between the respective sub-pixel location and the second pixel at the integer location,
wherein the sub-pixel interpolation filter and the triangular filter have same weights for at least one first sub-pixel location,
wherein the sub-pixel interpolation filter and the triangular filter have different weights for at least one second sub-pixel location,
wherein a first interpolation-filter weight of the weight tuple of the sub-pixel interpolation filter is less than a first triangular-filter weight of a triangular-filter weight tuple of the triangular filter for the second sub-pixel location, and a second interpolation-filter weight of the weight tuple of the sub-pixel interpolation filter is more than a second triangular-filter weight of the triangular-filter weight tuple of the triangular filter for the second sub-pixel location;
decode, from the encoded bitstream, a motion vector; and
decode the block using the sub-pixel interpolation filter and the motion vector.

18. The apparatus of claim 17, wherein in case that the sub-pixel location is closer to the first pixel than the second pixel, for at least the one weight tuple of the weight tuples, a first weight of the one weight tuple and used for the first pixel is higher than a bilateral weight that is based on the second distance.

19. The apparatus of claim 17, wherein, in a case of a 7-bit precision, the weight tuples comprise (128, 0), (122, 6), (116, 12), (108, 20), (100, 28), (92, 36), (82, 46), (74, 54), (64, 64), (54, 74), (46, 82), (36, 92), (28, 100), (20, 108), (12, 116), and (6, 122) for respective sub-pixel precisions of full pixel, 1/16 pixel, 1/8 pixel, 3/16 pixel, 1/4 pixel, 5/16 pixel, 3/8 pixel, 7/16 pixel, 1/2 pixel, 9/16 pixel, 5/8 pixel, 11/16 pixel, 3/4 pixel, 13/16 pixel, 7/8 pixel, and 15/16 pixel.

20. The apparatus of claim 17, wherein, in a case of a 7-bit precision, the weight tuples comprise (128, 0), (124, 4), (118, 10), (110, 18), (102, 26), (94, 34), (84, 44), (74, 54), (64, 64), (54, 74), (44, 84), (34, 94), (26, 102), (18, 110), (10, 118), and (4, 124) for respective sub-pixel precisions of full pixel, 1/16 pixel, 1/8 pixel, 3/16 pixel, 1/4 pixel, 5/16 pixel, 3/8 pixel, 7/16 pixel, 1/2 pixel, 9/16 pixel, 5/8 pixel, 11/16 pixel, 3/4 pixel, 13/16 pixel, 7/8 pixel, and 15/16 pixel.

* * * * *